United States Patent
Tsubooka et al.

(10) Patent No.: US 8,130,087 B2
(45) Date of Patent: Mar. 6, 2012

(54) DISPLAY CONTROL DEVICE, INFORMATION DISPLAY SYSTEM FOR MOVING OBJECT, MODULE FOR DRIVER'S SEAT AND MOVING OBJECT

(75) Inventors: Satoshi Tsubooka, Sakurai (JP); Toshiya Okamoto, Souraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 562 days.

(21) Appl. No.: 12/377,697

(22) PCT Filed: May 16, 2007

(86) PCT No.: PCT/JP2007/060005
§ 371 (c)(1),
(2), (4) Date: Feb. 17, 2009

(87) PCT Pub. No.: WO2008/038435
PCT Pub. Date: Apr. 3, 2008

(65) Prior Publication Data
US 2010/0164698 A1    Jul. 1, 2010

(30) Foreign Application Priority Data
Sep. 28, 2006   (JP) ................................. 2006-264743

(51) Int. Cl.
*B60Q 1/00* (2006.01)
(52) U.S. Cl. ..................... 340/425.5; 340/679; 340/680; 340/686.1; 340/686.5
(58) Field of Classification Search .................. 340/679, 340/680, 686.1, 686.5; 345/158; 700/108, 700/106, 111, 99
See application file for complete search history.

(56) References Cited

U.S. PATENT DOCUMENTS

| | | | |
|---|---|---|---|
| 2002/0117179 A1* | 8/2002 | Bergo et al. | 131/280 |
| 2003/0118367 A1* | 6/2003 | Omata et al. | 399/110 |
| 2004/0148136 A1* | 7/2004 | Sasaki et al. | 702/188 |
| 2004/0263647 A1 | 12/2004 | Yamaguchi | |
| 2005/0244190 A1* | 11/2005 | Omata et al. | 399/121 |
| 2009/0198809 A1* | 8/2009 | Goto et al. | 709/223 |

FOREIGN PATENT DOCUMENTS

| | | |
|---|---|---|
| JP | 2002-216284 A | 8/2002 |
| JP | 2003-151042 A | 5/2003 |
| JP | 2004-224105 A | 8/2004 |
| JP | 2004-279855 A | 10/2004 |
| JP | 2005-014686 A | 1/2005 |
| JP | 2006-232199 A | 9/2006 |
| JP | 2006-248406 A | 9/2006 |
| JP | 2006-253847 A | 9/2006 |

OTHER PUBLICATIONS

Official Communication issued in International Patent Application No. PCT/JP2007/060005, mailed on Jun. 19, 2007.

* cited by examiner

*Primary Examiner* — Daryl Pope
(74) *Attorney, Agent, or Firm* — Keating & Bennett, LLP

(57) ABSTRACT

An imaging module that generates a plurality of display images respectively based on a plurality of pieces of state information different from each other, in accordance with an instruction signal from a controller, and allows the plurality of display images to be displayed simultaneously on a display screen of a liquid crystal display device, and a recording and reproducing unit that performs a capture operation, in accordance with the instruction signal from the controller are provided. The recording and reproducing unit records the display screen on the recording medium as screen data through the capture operation.

11 Claims, 9 Drawing Sheets

DISPLAY CONTROL DEVICE, INFORMATION DISPLAY SYSTEM FOR MOVING OBJECT, MODULE FOR DRIVER'S SEAT AND MOVING OBJECT

BACKGROUND OF THE INVENTION

1. Field of the Invention

The present invention relates to a display control device for allowing a display device to display information on the operating condition of a moving object such as an automobile to an operator of the moving object, and an information display system for a moving object, a module for a driver's seat, and a moving object including the display control device.

2. Description of the Related Art

Recently, for example, in an automobile, in order to support the driving operation of a driver, an image pickup device such as a charge coupled device (CCD) is mounted, and an information display system for displaying a picked-up image from the image pickup device on a display device placed inside the automobile has been developed and put into practical use.

Furthermore, as the information display system for a moving object as described above, for example, JP 2002-216284 A provides a system in which a display control device provided therein determines the start and stop of traveling of an automobile (moving object), and picked-up image data from a plurality of image pickup devices is recorded on a recording medium based on the determination results. In the conventional display control device, for example, even when an accident occurs in the automobile, the operating state of the automobile at a time of the occurrence of the accident is determined using the data on the picked-up images recorded on the recording medium, whereby the cause of the occurrence of the accident can be clarified.

Furthermore, in the conventional display control device, as described in, for example, JP 2005-14686 A, it has been proposed that the display device is provided with a touch panel function so that a driver can change the image pickup direction of a mounted camera using the provided touch panel function. Then, in the conventional display control device, even when an emergency arises, a required object can be picked up to be recorded on a recording medium by a simple operation.

However, in the conventional display control device as described above, the data on the picked-up image from the image pickup device is merely recorded on the recording medium. Therefore, the conventional display control device has a problem in that it is difficult for allowing the exact operating state of the automobile (moving object) to be grasped easily.

SUMMARY OF THE INVENTION

In view of the above problems, preferred embodiments of the present invention provide a display control device that allows the operating state of a moving object to be grasped easily and exactly, and an information display system for a moving object, a module for a driver's seat, and a moving object including the display control device.

A display control device according to a preferred embodiment of the present invention receives state information from each part of a moving object and allows a display device to display a display image based on the input state information. The display control device includes a display operation determination unit that selects state information to be displayed on a display screen of the display device, based on a plurality of pieces of the input state information, and determines a display position on the display screen of a display image based on the selected state information; an image generation unit that generates a plurality of display images respectively based on the plurality of pieces of state information different from each other, in accordance with an instruction signal from the display operation determination unit, and allows the plurality of display images to be displayed simultaneously on the display screen; a recording medium for recording data on the display image that is being displayed on the display screen; a recording unit that performs a data recording operation with respect to the recording medium; and a capture operation instruction unit that outputs an instruction signal to the recording unit on a predetermined time interval basis, thereby allowing the recording unit to perform a capture operation of capturing the display screen as screen data.

In the display control device configured as described above, the display operation determination unit selects the state information to be displayed on the display screen of the display device, based on a plurality of pieces of the input state information, and determines the display position on the display screen of the display image based on the selected state information. Furthermore, the image generation unit generates a plurality of display images respectively based on a plurality of pieces of state information different from each other, in accordance with an instruction signal from the display operation determination unit, and allows the plurality of display images to be displayed simultaneously on the display screen. Thus, the display control device can display a display image suitable for allowing the operating state of the moving object to be grasped on the display screen of the display device. Furthermore, the capture operation instruction unit allows the recording unit to perform the capture operation, thereby allowing the display screen to be captured as screen data and recording the screen data on the recording medium. Thus, unlike the above-mentioned conventional example, the operating state of the moving object can be grasped easily and exactly.

Furthermore, in the above-mentioned display control device, it is preferred that the state information contains operation information regarding an instruction for an operation with respect to the moving object, operating information regarding an operating state of the moving object including a speed and a moving direction of the moving object, and image pickup information from an image pickup device provided in the moving object.

In this case, the display operation determination unit can select and determine the display image to be displayed on the display screen of the display device while grasping the operating state of the moving object more exactly. This allows the more exact operating state of the moving object to be grasped easily.

Furthermore, in the above-mentioned display control device, the capture operation instruction unit may allow a display screen to be subjected to the capture operation to be captured as screen data on one frame of a still image, and allow the recording unit to perform the capture operation with respect to the display screen in accordance with a recording interval and the number of recording frames previously set.

In this case, the amount of screen data to be recorded on the recording medium can be reduced, and the recording capacity of the recording medium can be prevented from increasing.

Furthermore, it is preferred that the above-mentioned display control device includes an abnormality determination unit that determines whether or not an abnormality has occurred in the moving object, based on the input state information, wherein the abnormality determination unit notifies the display operation determination unit of state information used in abnormality determination, when determining that an abnormality has occurred in the moving object, the display operation determination unit selects the notified state information as state information to be displayed on the display screen, when being notified of the state information from the abnormality determination unit, determines a display position on the display screen, and notifies the capture operation instruction unit of an occurrence of an abnormality, and the capture operation instruction unit allows the recording unit to perform the capture operation, when being notified of the occurrence of an abnormality from the display operation determination unit.

In this case, the state information on the moving object when an abnormality has occurred is recorded on the recording medium as screen data, so that recording information effective for verifying the occurrence of an abnormality of the moving object can be kept, and the cause of the occurrence of an abnormality can be clarified with high precision.

Furthermore, the above-mentioned display control device may include a capture operation changing unit that is notified of the state information used in abnormality determination from the abnormality determination unit, determines a recording interval and the number of recording frames in the capture operation which the capture operation instruction unit indicates with respect to the recording unit, based on the notified state information, and changes the recording interval and the number of recording frames.

In this case, the recording interval and the number of recording frames of screen data to be recorded on the recording medium in the capture operation can be changed suitably in accordance with the abnormality occurring in the moving object, and the cause of the occurrence of an abnormality and the like can be clarified with higher precision while the recording capacity of the recording medium is being used effectively.

Furthermore, it is preferred that the above-mentioned display control device includes a time information providing unit that notifies the image generation unit of time information indicating current date and time, thereby allowing the time information to be displayed on the display screen.

In this case, the recording time of the screen data recorded on the recording medium is recorded together with the screen data, so that the change with the passage of time of the operating state of the moving object can be grasped easily and exactly.

Furthermore, in the display control device, it is preferred that the recording unit performs predetermined data compression processing, when recording the screen data on the recording medium through the capture operation.

In this case, the amount of screen data to be recorded on the recording medium can be reduced more exactly, and the recording capacity of the recording medium can be prevented from increasing more exactly.

Furthermore, the above-mentioned display control device may include a reproducing unit that reproduces the screen data recorded on the recording medium, and a reproducing operation instruction unit that allows the reproducing unit to perform a reproducing operation of the screen data, in accordance with an instruction signal from outside.

In this case, the reproducing unit reproduces the screen data recorded on the recording medium, whereby the more exact operating state of the moving unit can be recognized visually and the operating state can be grasped more easily.

Furthermore, an information display system for a moving object according to a preferred embodiment of the present invention includes any of the above-mentioned display control devices, and a display device that displays a display image generated by the image generation unit of the display control device.

In the information display system for a moving object configured as described above, a display image suitable for allowing the operating state of the moving object to be grasped is displayed on the display device, so that the operating state of the moving object can be grasped easily and exactly.

Furthermore, a module for a driver's seat according to a preferred embodiment of the present invention is attached around a driver's seat of a moving object and includes the above-mentioned information display system for a moving object.

A moving object according to a preferred embodiment of the present invention includes the information display system for a moving object, wherein the display device is attached to a position that is recognizable visually at least from the driver's seat.

In the module for a driver's seat and the moving object configured as described above, the information display system for a moving object is used, which allows the operating state of the moving object to be grasped easily and exactly, so that the operator of the moving object can operate the moving object while grasping the operating state of the moving object exactly and rapidly.

According to various preferred embodiments of the present invention, a display control device that allows the operating state of a moving object to be grasped easily and exactly, and an information display system for a moving object, a module for a driver's seat, and a moving object that use the display control device can be provided.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Hereinafter, preferred embodiments of a display control device of the present invention, and an information display system for a moving object, a module for a driver's seat, and a moving object including the display control device will be described with reference to the drawings. In the following description, the case where a preferred embodiment of the present invention is applied to an automobile (passenger car) will be illustrated. It should be noted that a target to which preferred embodiments of the present invention is applied is not limited to only an automobile. Preferred embodiments of the present invention can be applied to various vehicles (moving apparatuses or transfer apparatuses) such as a motorcycle, a motor tricycle, a special vehicle, a railcar, other road vehicles, an amphibious vehicle, an airplane, or a vessel, in addition to an automobile. Furthermore, the present invention is not limited to the vehicles mainly for movement or transfer as described above, and can also be applied to simulators (including play machines set in play facilities) allowing an operator to simulate the operation of various kinds of vehicles as described above. In the present application, the vehicles, simulators, and the like as described above will be referred to as a "moving object" collectively.

Figure 1:
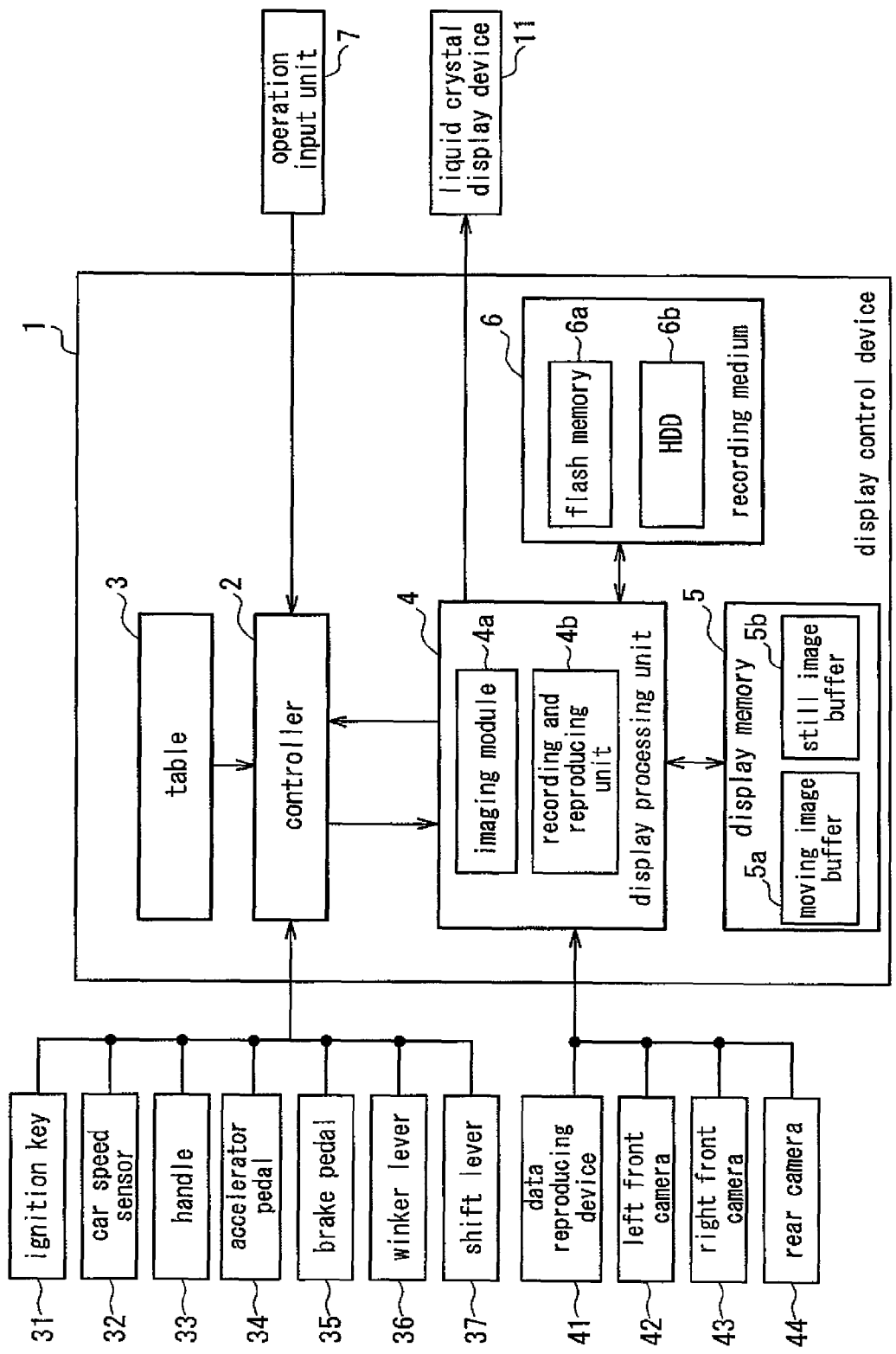
FIG. 1 is a block diagram showing main configurations of a display control device and an information display system for a moving object according to one preferred embodiment of the present invention.
Figure 2:
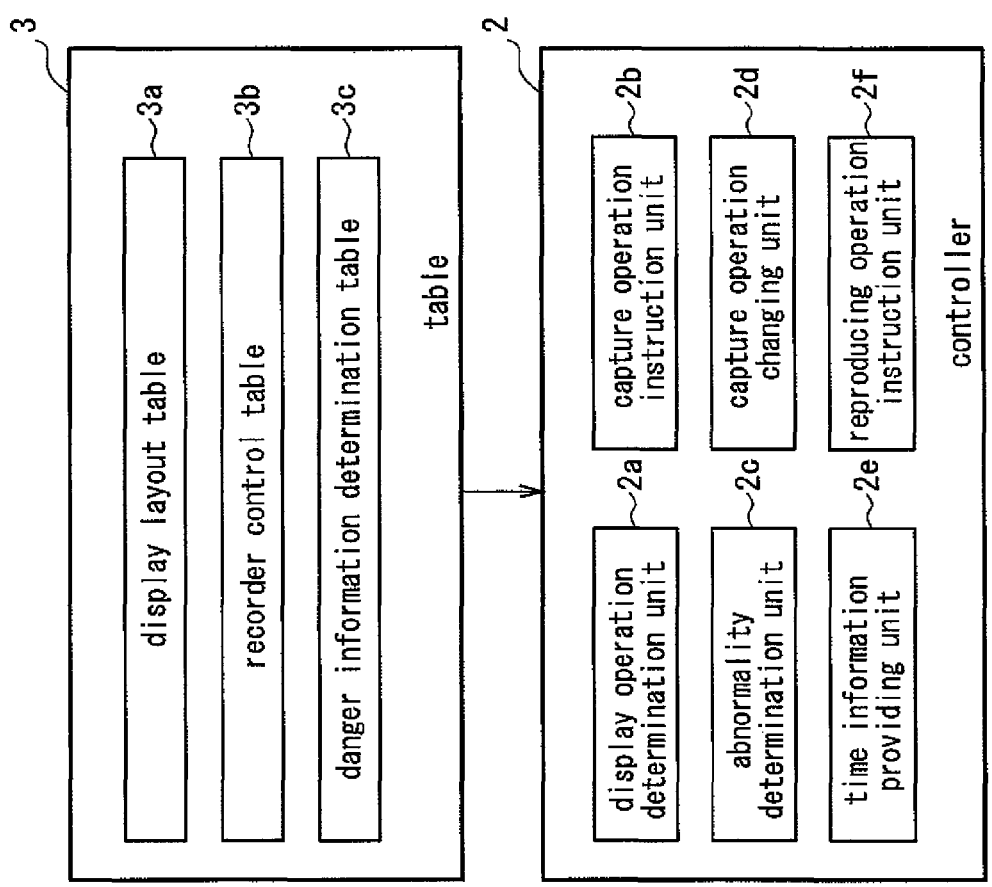
FIG. 2 is a block diagram showing specific exemplary configurations of a controller and a table shown in FIG. 1.
Figure 3:
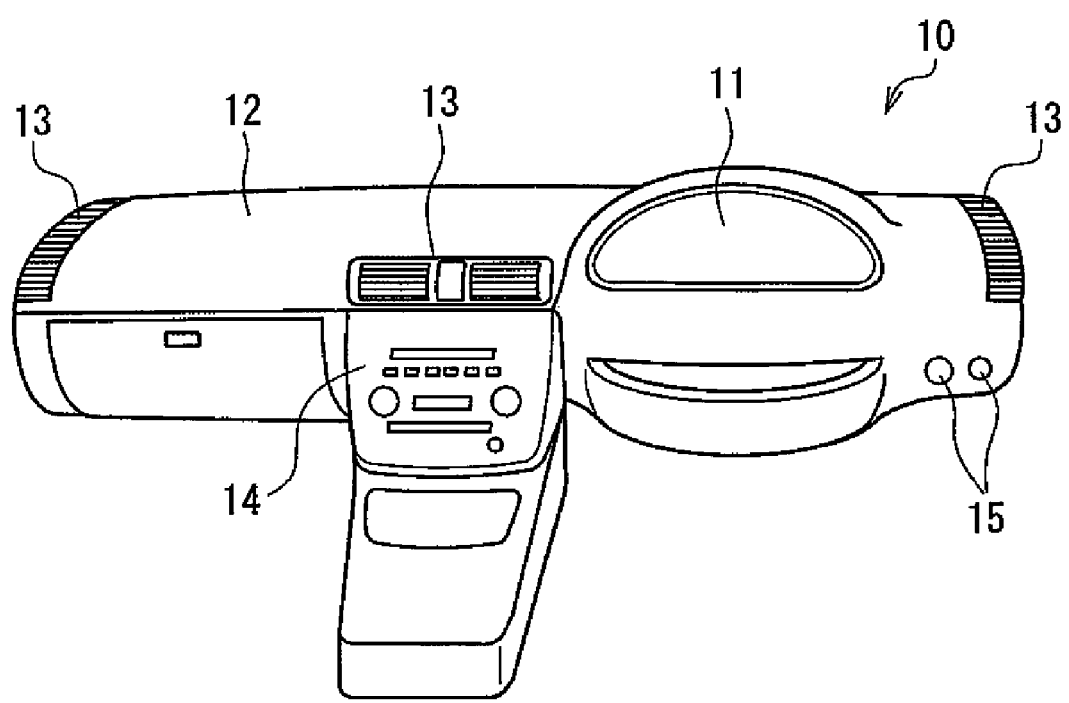
FIG. 3 is a front view showing an outer appearance of a cockpit module for an automobile with the above-mentioned information display system for a moving object incorporated therein.

FIG. 1 is a block diagram showing main configurations of a display control device and an information display system for a moving object according to one preferred embodiment of the present invention, and FIG. 2 is a block diagram showing specific exemplary configurations of a controller and a table shown in FIG. 1. FIG. 3 is a front view showing an outer appearance of a cockpit module for an automobile with the information display system for a moving object incorporated therein.

Herein, first, the cockpit module for an automobile as the module for a driver's seat of the present preferred embodiment will be described specifically with reference to FIG. 3.

As shown in FIG. 3, a cockpit module for an automobile 10 according to the present preferred embodiment includes a liquid crystal display device 11 configured so as to display a synthetic image of a dashboard for an automobile, in place of conventional analog measuring instruments such as a speedometer and a tachometer and a conventional dashboard for an automobile including an indicator lamp composed of an LED or the like.

The liquid crystal display device 11 is not a segment type liquid crystal display unit that has been used frequently in conventional automobiles, but a dot matrix type liquid crystal panel display device. The liquid crystal display device 11 is capable of displaying an image of any pattern, so that the liquid crystal display device 11 functions as an information display device for an automobile by displaying a synthetic image obtained by combining images of various elements such as various measuring instruments and an indicator lamp.

Furthermore, as described later, the liquid crystal display device 11 is also configured so as to display, as a synthetic image, not only an image of the dashboard but also an image picked up by a camera mounted in an automobile, a car navigation image, a received image of television broadcast, a reproduced image of a DVD player or the like mounted in the automobile, etc.

Furthermore, the liquid crystal display device 11 is attached to an instrument panel 12 that is a frame of the cockpit module 10 so as to be positioned on a reverse side of a handle (steering wheel) not shown in the figure. The cockpit module 10 includes not only the liquid crystal display device 11 but also an air-conditioning unit (not shown), an air-conditioning duct 13 that introduces air from the air-conditioning unit into the automobile, an audio module 14, lamp switches 15, a steering mechanism (not shown), an air bag module (not shown), and the like.

The configuration of the cockpit module 10 shown in FIG. 3 is merely an example, and the preferred embodiments of the present invention are not limited thereto. For example, in the example shown in FIG. 3, the liquid crystal display device 11 is placed so as to face a driver. However, the liquid crystal display device 11 may be placed instead in a center portion of the instrument panel 12, that is, between a driver's seat and a passenger seat.

A display control device 1 of the present preferred embodiment will be described specifically with reference to FIGS. 1 and 2.

In FIG. 1, the display control device 1 of the present preferred embodiment is preferably configured as one of a number of electronic control units (ECUs) mounted on the automobile, and controls an information display system for an automobile (moving object) of the present preferred embodiment including the liquid crystal display device 11. The display control device 1 generates a synthetic image based on the operating state (behavior) of the automobile with respect to a display screen (instrument panel display screen) of the liquid crystal display device 11 incorporated in the instrument panel 12 and allows the display screen to display the synthetic image as an integrative display image (described in detail later).

Specifically, as shown in FIG. 1, the display control device 1 includes a controller 2 configured using data processing devices such as a CPU and a digital signal processor (DSP), and a table 3 that is referred to by the controller 2 as appropriate. Furthermore, the display control device 1 includes a display processing unit 4 configured using, for example, an Application Specific Integrated Circuit (ASIC), a display memory 5 that temporarily holds data on a display image output to the liquid crystal display device 11 to be displayed, and a recording medium 6 that stores data on the display image on the display screen captured through a capture operation described later. The display processing unit 4 includes an imaging module 4a as an image generation unit and a recording and reproducing unit 4b in which a recording unit and a reproducing unit are configured integrally.

Furthermore, an operation input unit 7 including operation keys, input buttons, and the like is connected to the display control device 1. In the display control device 1, an instruction for an operation from a user such as a driver (operator) is input through the operation input unit 7, and the display control device 1 can drive each part of the information display system in accordance with the input instruction for an operation.

Furthermore, the display control device 1 receives state information indicating the state of each part of the automobile and appropriately selects a plurality of pieces of the input state information to display the selected information on the liquid crystal display device 11. More specifically, the display control device 1 is connected to an in-vehicle LAN configured using a wire harness or the like, and receives the state information corresponding to a number of other ECUs (for example, ECUs controlling a steering mechanism and driving mechanisms such as an engine and a mission) provided in the respective parts of the automobile sequentially from the ECUs.

Specifically, as illustrated in FIG. 1, an ignition key 31 and a car speed sensor 32 of the automobile are connected to the display control device 1 via the in-vehicle LAN, and a detection signal indicating the ON/OFF operation with respect to an engine and a detection signal indicating the traveling speed of the automobile are respectively input from the ignition key 31 and the car speed sensor 32 to the controller 2. Furthermore, a handle 33 is connected to the display control device 1 via a steering angle detection unit (not shown), and the steering angle (rotation angle) of the handle 33 involved in the driving operation of the driver is input to the controller 2.

Furthermore, an accelerator pedal 34 and a brake pedal 35 are connected to the display control device 1 respectively via a stepping amount detection unit (not shown), and each stepping amount of the accelerator pedal 34 and the brake pedal 35 involved in the driving operation of the driver is input to the controller 2. Furthermore, a state detection unit (not shown) that detects the operating states of a blinker lever (direction indicator) 36 and a shift lever 37 respectively is connected to the display control device 1, and a detection signal that indicates the operating state of the blinker lever 36 and the shift position of the shift lever 37 based on the operation of the driver respectively is input from the corresponding state detection unit to the controller 2.

Furthermore, a data reproducing device 41 included in a car navigation system is connected to the display control device 1 so that image information indicating car navigation information is input to the display processing unit 4. Furthermore, image pickup information from an image pickup device provided in the automobile is input to the display control device 1. More specifically, a left front camera 42 and a right front camera 43 set respectively on the left front side and the right front side of a body of the automobile, and a rear camera 44 set on the back side of the body of the automobile are connected to each other, and data (image pickup information) on picked-up images from the respective cameras 42 to 44 are input to the display processing unit 4.

As described above, the state information contains operation information regarding the instruction for an operation based on the driving operation of the driver with respect to the automobile, operating information regarding the operating state of the automobile including a traveling speed and a traveling (moving) direction of the automobile, and image pickup information from the image pickup device provided in the automobile.

Furthermore, the above-mentioned state information can contain various pieces of information (e.g., a fuel remaining amount, an interior temperature, etc.) related to the states that have no direct relationship with the mechanical operation of each part, in addition to the above-mentioned operating information related to the mechanical operating state of each part of the automobile. Specific examples of the state information include the open/close states of a door and a trunk, the state of door locking, the state of a tire, the presence/absence of an abnormality of an air bag, the wearing state of a seat belt, the blow-off temperature from an air-conditioner, a room temperature, an outside air temperature, a fuel remaining amount, an oil remaining amount, a radiator temperature (water thermometer), and an engine temperature.

Furthermore, in the case where a shock (crash) detection sensor is set in the automobile, a detection signal from the shock detection sensor can be used as state information. Furthermore, for example, in the case where a crash avoidance radar is provided in the automobile, information from the radar indicating the distance between the automobile and another automobile can be used as state information.

Furthermore, by using a wireless transmitter/receiver mounted on the automobile, data information (also containing information that can be converted from voice information into characters and images) containing road traffic jam information from an outside traffic system such as an intelligent transportation system (ITS) and weather forecast information can be used as state information.

Referring to FIG. 2, the controller 2 is functionally provided with a display operation determination unit 2a, a capture operation instruction unit 2b, an abnormality determination unit 2c, a capture operation changing unit 2d, a time information providing unit 2e, and a reproducing operation instruction unit 2f. Furthermore, as illustrated in FIG. 2, the table 3 contains a display layout table 3a, a recorder control table 3b, and a danger information determination table 3c.

The display operation determination unit 2a selects and determines the state information to be displayed on the display screen of the liquid crystal display device 11 based on a plurality of pieces of input state information. Furthermore, the display operation determination unit 2a determines the display position on the display screen of a display image based on the selected state information. Furthermore, the determination operation in the display operation determination unit 2a is performed when the display operation determination unit 2a refers to the display layout table 3a.

That is, the display layout table 3a is a table for determining a display layout that defines what display image should be displayed in which portion of the display screen of the liquid crystal display device 11, in accordance with various operating states of the automobile determined from the content of each of a plurality of pieces of state information input to the controller 2. Specifically, in the display layout table 3a, various display layouts that vary in size and display position of a display image is associated with a combination of the content of each of a plurality of pieces of state information, in accordance with the operating state of the automobile so that the driver can easily recognize through intuition. The display operation determination unit 2a obtains a suitable display layout from the display layout table 3a based on the content of each of the above-mentioned plurality of pieces of state information, whereby the display position on the display screen of a display image based on the state information to be displayed on the display screen is determined.

Furthermore, the display operation determination unit 2a outputs the determined state information and an instruction signal indicating the display position of a display image based on the state information to the imaging module 4a (FIG. 1) of the display processing unit 4. Thus, in the liquid crystal display device 11, the display image of the state information determined by the display operation determination unit 2a is displayed on the display screen in the obtained display layout, whereby a suitable information display based on the operating state of the automobile can be realized.

The capture operation instruction unit 2b outputs an instruction signal to the recording and reproducing unit 4b (FIG. 1) of the display processing unit 4 on a predetermined period of time basis, thereby allowing the recording and reproducing unit 4b to perform the capture operation of capturing a display screen as screen data. Furthermore, the capture operation instruction unit 2b instructs the recording and reproducing unit 4b to capture the display screen to be subjected to the capture operation as screen data on one frame of a still image. Thus, the screen data is recorded on the recording medium 6 (FIG. 1) by the recording and reproducing unit 4b.

Furthermore, the instruction operation in the capture operation instruction unit 2b is performed when the capture operation instruction unit 2b refers to the recorder control table 3b. That is, the operation contents in the capture operation are previously set in the recorder control table 3b. Specifically, in the recorder control table 3b, the recording interval and the number of recording frames are previously set regarding the capture operation to be performed by the recording and reproducing unit 4b.

More specifically, for example, in the case where the liquid crystal display device 11 is configured so as to be able to display 60 frames of a display image (moving image) per second, for example, one second (i.e., 60-frame) interval is set as the recording interval in the capture operation and for example, 30 frames for 30 seconds are set as the number of recording frames in the recorder control table 3b.

As described above, the capture operation instruction unit 2b allows the recording and reproducing unit 4b to perform the capture operation, thereby allowing the recording and reproducing unit 4b to capture the display screen as screen data on one frame of a still image. Furthermore, the capture operation instruction unit 2b allows the screen data through the capture operation to be recorded on the recording medium 6 in accordance with the recording interval and the number of recording frames previously set in the recorder control table 3b. Therefore, the amount of screen data to be recorded on the recording medium 6 can be reduced.

More specifically, compared with the case where the capture operation is performed with respect to all the display images that can be displayed within 30 seconds in the liquid crystal display device 11, i.e., the case where a video capture operation of capturing a moving image is performed, the amount of screen data to be recorded on the recording medium 6 can be reduced to 1/60 (=30/1800). As a result, the recording capacity of the recording medium 6 can be prevented from increasing, which enables the use of a recording medium with a small recording capacity, and can prevent the increase in cost involved in the increase in a recording capacity.

The abnormality determination unit 2c determines whether or not an abnormality has occurred in the automobile based on the input state information. Furthermore, the determination operation in the abnormality determination unit 2c is performed when the abnormality determination unit 2c refers to the danger information determination table 3c.

That is, in the danger information determination table 3c, threshold values, conditions, and the like for determining that the operating state of the automobile is in an abnormal state or a dangerous state are associated with the state information corresponding to danger information, regarding each of a plurality of pieces of state information. Specifically, in the danger information determination table 3c, a speed exceeding, for example, 60 (km/h) is set as danger information, regarding a traveling speed. Furthermore, a threshold value for determining a harsh braking operation from the detection result of the stepping amount detection unit for the brake pedal 35 (FIG. 1) and a threshold value for determining a harsh handle operation from the detection result of the steering angle detection unit for the handle 33 (FIG. 1) are set as danger information. Furthermore, the detection of various abnormalities indicating the open state of a door during traveling and the like is performed, and notification information notifying the driver that the corresponding warning light provided in the automobile is lit is set as danger information. Furthermore, a threshold value for determining crash (traffic) accident and the like from the detection result of the shock detection sensor is set as danger information.

Furthermore, when the abnormality determination unit 2c determines that an abnormality has occurred in the automobile, the abnormality determination unit 2c notifies the display operation determination unit 2a and the capture operation changing unit 2d of the state information used in the abnormality determination.

On the other hand, when the display operation determination unit 2a is notified of the state information from the abnormality determination unit 2c, the display operation determination unit 2a selects the notified state information as the state information to be displayed on the display screen of the liquid crystal display device 11 and determines the display position on the display screen. Then, the display operation determination unit 2a outputs the selected state information and an instruction signal indicating the display position of the display image based on the state information to the imaging module 4a, whereby the display image of the state information used in the abnormality determination is displayed on the display screen.

Furthermore, the display operation determination unit 2a is configured so as to notify the capture operation instruction unit 2b of the occurrence of an abnormality, thereby allowing the recording and reproducing unit 4b to perform the capture operation without fail when an abnormality occurs.

The capture operation changing unit 2d is notified of the state information used in the abnormality determination by the abnormality determination unit 2c, and determines the recording interval and the number of recording frames in the capture operation which the capture operation instruction unit 2b indicates to the recording and reproducing unit 4b, in accordance with the notified state information, whereby the recording internal and the number of recording frames are changed. Furthermore, the change operation in the capture operation changing unit 2d is performed when the capture operation changing unit 2d refers to the recorder control table 3b.

That is, in the recorder control table 3b, various abnormalities occurring in the automobile are associated with the recording interval and the number of recording frames of screen data suitable for recording each of various abnormalities through the capture operation. Then, the capture operation changing unit 2d searches for the recorder control table 3b based on the state information notified from the abnormality determination unit 2c, thereby obtaining the recording interval and the number of recording frames based on the abnormality determined in the abnormality determination unit 2c, and notifies the capture operation instruction unit 2b of the recording interval and the number of recording frames. After that, the capture operation instruction unit 2b allows the recording and reproducing unit 4b to perform the capture operation in accordance with the recording interval and the number of recording frames from the capture operation changing unit 2d.

The time information providing unit 2e is configured so as to notify the imaging module 4a of time information indicating current date and time so as to display the time information on the display screen of the liquid crystal display device 11.

The reproducing operation instruction unit 2f allows the recording and reproducing unit 4b to perform a reproducing operation of the screen data in accordance with an instruction signal from outside. That is, the reproducing operation instruction unit 2f reproduces the screen data held on the recording medium 6 in accordance with a request for reproduction input from a user via the operation input unit 7 (FIG. 1), whereby the display screen of the liquid crystal display device 11 is displayed.

Returning to FIG. 1, the display processing unit 4 has the imaging module 4a and the recording and reproducing unit 4b and is configured so as to be operated in accordance with an instruction signal from the controller 2. Furthermore, the display processing unit 4 transmits the display information regarding the display image that is being displayed on the display screen of the liquid crystal display device 11 and the operating information regarding the operating conditions of the display memory 5 and the recording medium 6 to the controller 2.

The imaging module 4a constitutes the image generation unit as described above, and generates a plurality of display images respectively based on a plurality of pieces of state information different from each other in accordance with an instruction signal from the display operation determination unit 2a (FIG. 2) and allows the plurality of display images to be displayed simultaneously on the display screen of the liquid crystal display device 11.

Specifically, the imaging module 4a writes moving image data (stream data) on car navigation information from the data reproducing device 41 and image pickup information from the left front camera 42 and the like input to the display processing unit 4 in a moving image buffer 5a holding data on moving images provided in the display memory 6, in accordance with the instruction signal from the display operation determination unit 2a. Furthermore, the moving image buffer 5a has a storage region corresponding to the size of the display screen of the liquid crystal display device 11, and data on the corresponding moving image is written to be held at the display position (layout position) indicted by the instruction signal from the display operation determination unit 2a. Furthermore, in the moving image buffer 5a, in order to display the car navigation information and image pickup information in real time, the data on the corresponding moving images is updated periodically.

Furthermore, the imaging module 4a writes the data on still images of components (for example, a display frame of a meter, an oil pressure gauge, or a fuel gauge, a position pattern of the shift lever 37, a pattern of the blinker lever 36) to be required in the display screen in a still image buffer 5b holding the data on still images provided in the display memory 6, thereby allowing the still image buffer 5b to hold the data, in accordance with the instruction signal from the display operation determination unit 2a. Furthermore, the still image buffer 5b has a storage region corresponding to the size of the display screen of the liquid crystal display device 11 in the same way as in the moving image buffer 5a, and data on a display image based on the indicated state information and a still image of the component is written to be held at the display position (layout position) indicated by the instruction signal from the display operation determination unit 2a.

Furthermore, the imaging module 4a is provided with image processing functions such as image synthesis processing, image rotation processing, scaling processing of increasing or decreasing the size of an image, and block transfer processing of data. The imaging module 4a performs the above image processing if required, at a time of writing or reading with respect to the moving image buffer 5a and the still image buffer 5b.

Furthermore, when the imaging module 4a allows the display screen of the liquid crystal display device 11 to display a display image in accordance with the instruction signal from the display operation determination unit 2a, the imaging module 4a reads the data in the moving image buffer 5a and the still image buffer 5b and subjects the data to image synthesis processing, thereby generating screen data on the display screen to output it to the liquid crystal display device 11.

The recording and reproducing unit 4b is provided with functions of predetermined data compression processing with respect to a still image such as JPEG and data decompression processing corresponding to the compression processing. More specifically, the recording and reproducing unit 4b performs a capture operation with respect to a display screen in accordance with an instruction signal from the capture operation instruction unit 2b (FIG. 2), and when the screen data is recorded on the recording medium 6, the data on the display screen captured through the capture operation is subjected to the data compression processing and stored on the recording medium 6. Thus, the amount of screen data to be recorded on the recording medium 6 can be reduced more exactly, whereby the increase in a recording capacity of the recording medium 6 can be prevented more exactly. Furthermore, the amount of screen data on the recording medium 6 is reduced more exactly, so that the number of display screens to be captured through the capture operation can be increased easily.

The recording medium 6 is provided with a flash memory 6a and an HDD 6b. The flash memory 6a and the HDD 6b are both subjected to the recording and reproducing processing of the screen data by the recording and reproducing unit 4b. Until the abnormality determination unit 2c (FIG. 2) determines that an abnormality has occurred in the automobile, the recording processing of the screen data based on the capture operation is performed with respect to the flash memory 6a. When it is determined that an abnormality has occurred, the recording processing of the screen data based on the capture operation is performed with respect to the HDD 6b (described in detail later).

Hereinafter, a specific example displayed on the display screen of the liquid crystal display device 11 will be described also with reference to FIGS. 4 to 6.

Figure 4A:
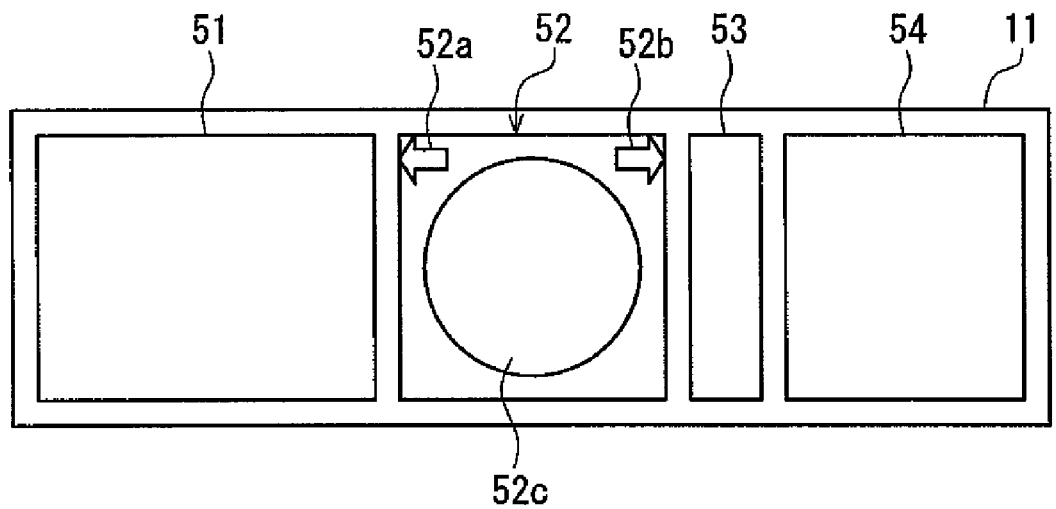
FIG. 4A is a plan view showing a specific example of a display screen displayed on the liquid crystal display device shown in FIG. 1.

A display layout in FIG. 4A is displayed on the display screen of the liquid crystal display device 11, when the controller 2 determines that the automobile is traveling normally at a speed less than that recognized with the above-mentioned danger information or determines that the automobile is at a standstill, based on the input state information. Specifically, the display layout includes a screen region 51 displaying, for example, car navigation information, and a screen region 52 displaying the traveling state of the automobile, which includes screen regions 52a, 52b showing the operating state of the right/left blinker lever 36 and a screen region 52c showing images of a speedometer (car speed) and a rotation number (tachometer).

Furthermore, the display layout is provided with a screen region 53 displaying the operating state of the shift lever 37 and a screen region 54 displaying an image of a fuel gauge and images of various warning lights such as the wearing state of a seat belt and the open/close state of doors.

Figure 4B:
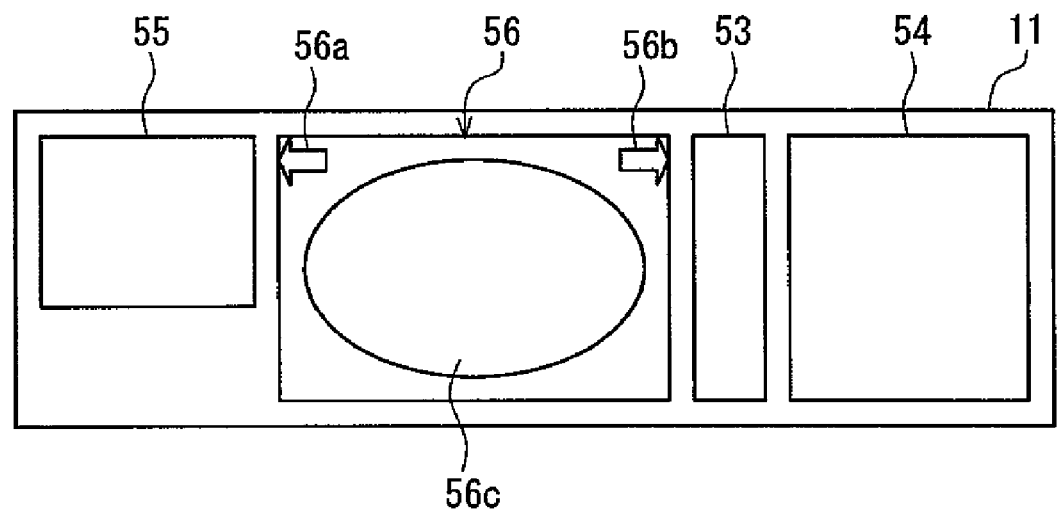
FIG. 4B is a plan view showing another specific example of the display screen.

Furthermore, a display layout in FIG. 4B is displayed on the display screen of the liquid crystal display device 11 when the controller 2 determines that the automobile is traveling at a high speed exceeding a predetermined speed, based on the input state information. In this display layout, a screen region 55 displaying car navigation information is set to be smaller than that in the display layout shown in FIG. 4A.

On the other hand, in a screen region 56 displaying the traveling condition of the automobile, screen regions 56a, 56b showing the operating state of the right/left blinker lever 36 have the same sizes as those of the screen regions 52a, 52b shown in FIG. 4A; however, a screen region 56c displaying images of a speedometer (car speed) and a rotation number (tachometer) is set to be larger than the screen region 52c shown in FIG. 4A. Furthermore, the controller 2 performs a display warning the driver visually by setting the background color of the image region 56c to be red, depending upon the traveling speed of the automobile.

Figure 5A:
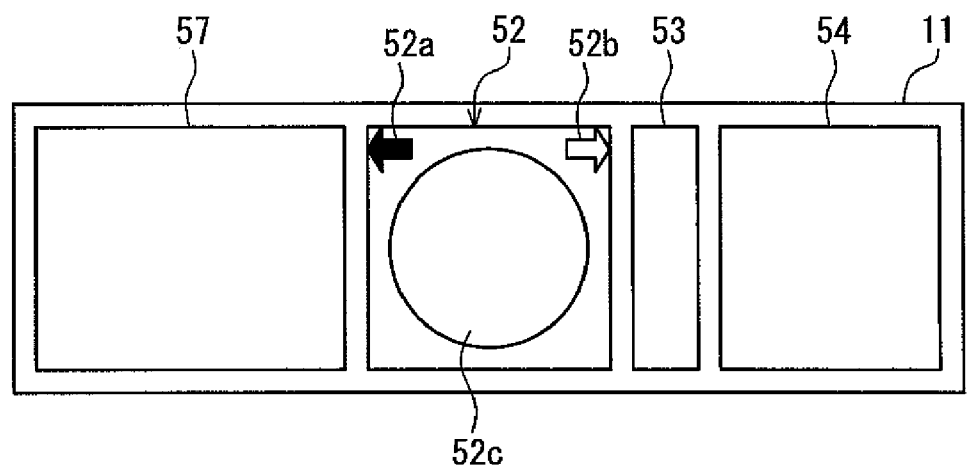
FIG. 5A and FIG. 5B are respectively plan views showing other specific examples of the display screen.

Furthermore, the display layout in FIG. 5A is displayed on the display screen of the liquid crystal display device 11 when the controller 2 determines that the automobile will turn to the left based on the input state information. In this display layout, a screen region 57 displaying image pickup information from the left front camera 42 is set, for example, in place of the screen region displaying car navigation information, and the image pickup information from the left front camera 42 is displayed in the screen region 57, whereby optimum traveling support can be performed with respect to the driver.

Furthermore, in this display layout, a display color in the screen region 52a is changed or flashes on/off based on the operating state of the left blinker lever 36, whereby the driver can visually recognize that the left blinker lever 36 has been operated.

Figure 5B:
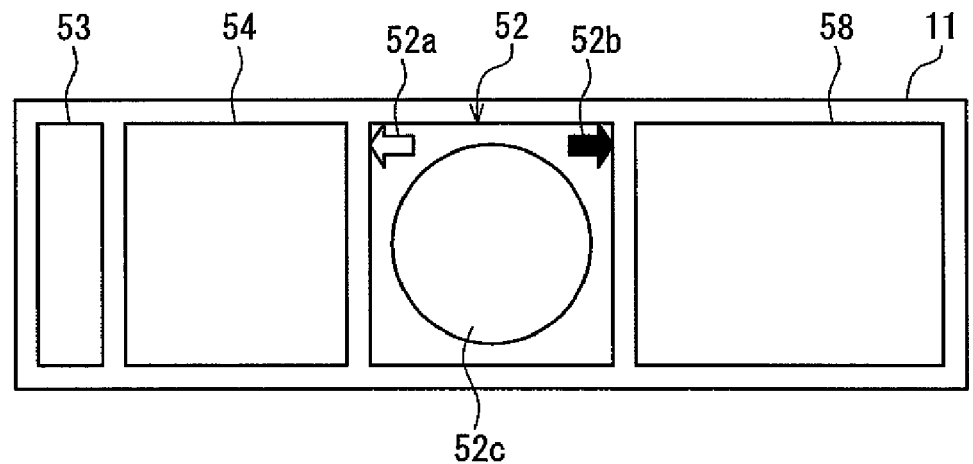

Furthermore, a display layout in FIG. 5B is displayed on the display screen of the liquid crystal display device 11 when the controller 2 determines that the automobile will turn to the right based on the input state information. In this display layout, a screen region 58 displaying the image pickup information from the right front camera 43 is set, for example, in place of the screen region displaying car navigation information. Furthermore, the screen region 58 is placed in a right-side portion of the display screen matched with the rotation direction of the handle 33, and image pickup information from the right front camera 43 is displayed in the screen region 58, whereby optimum traveling support can be performed with respect to the driver.

Furthermore, in this display layout, the display color in the screen region 52b is changed or flashes on/off based on the operating state of the right blinker lever 36, whereby the driver can visually recognize that the right blinker lever 36 has been operated.

Figure 6A:
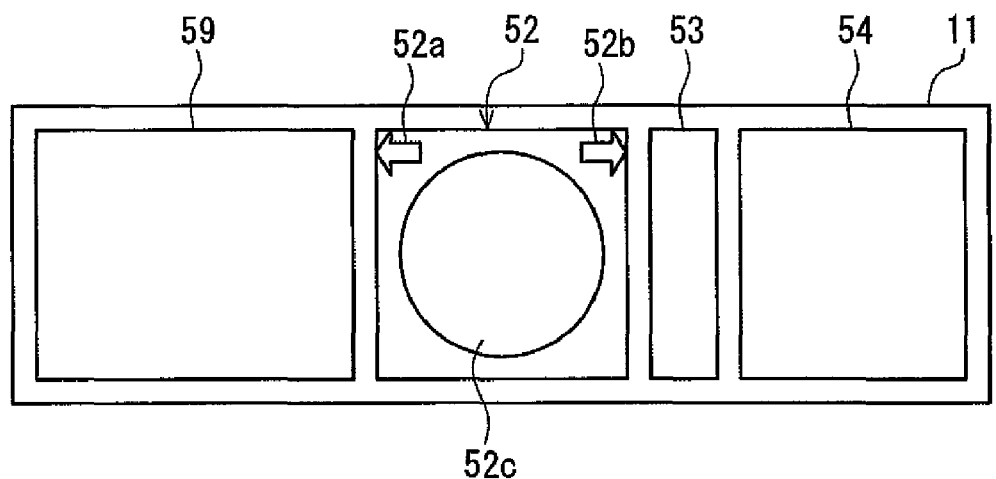
FIG. 6A and FIG. 6B are respectively plan views showing other specific examples of the display screen.

Furthermore, a display layout in FIG. 6A is displayed on the display screen of the liquid crystal display device 11 when the controller 2 determines that the automobile will travel backward based on the input state information. In this display layout, a screen region 59 displaying the image pickup information from the rear camera 44 is set, for example, in place of the screen region displaying car navigation information, and the image pickup information from the rear camera 44 is displayed in the screen region 59, whereby optimum traveling support can be performed with respect to the driver.

Figure 6B:
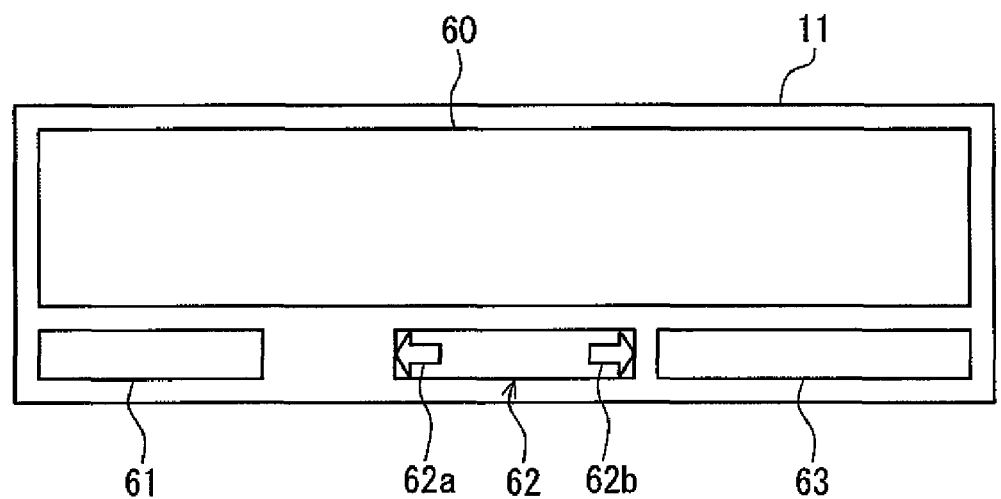

Furthermore, a display layout in FIG. 6B is displayed on the display screen of the liquid crystal display device 11 when the controller 2 determines that an automobile has been parked with a side brake pulled, based on the input state information. In this display layout, a screen region 60 displaying, for example, car navigation information or a received image of television broadcast is set. Furthermore, in this display layout, a screen region 61 displaying the operating state of the shift lever 37, a screen region 62 in which screen regions 62a, 62b showing the operating state of the right/left blinker lever 36 are provided, and a screen region 63 displaying an image of a fuel gauge and images of various warning lights such as the wearing state of a seat belt or the open/close state of doors are set.

Hereinafter, the operation of the display control device 1 of the present preferred embodiment configured as described above will be described specifically with reference to FIGS. 7 to 9. In the following description, the capture operation and the reproducing operation by the recording and reproducing unit 4b will be described mainly.

First, the capture operation when it is determined that an abnormality has not occurred in the automobile will be described with reference to FIG. 7.

Figure 7:
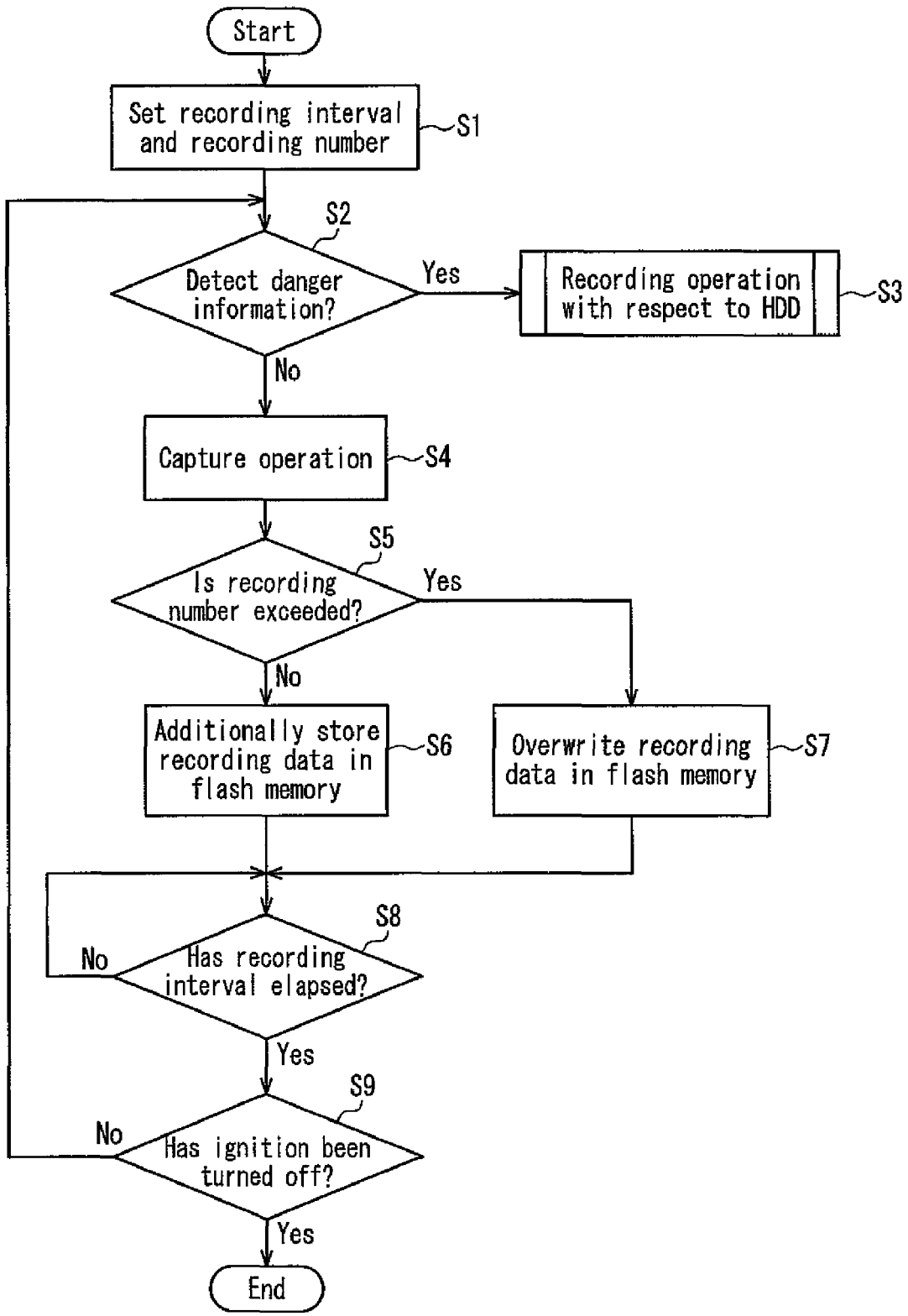
FIG. 7 is a flowchart showing a recording operation with respect to a flash memory shown in FIG. 1.

As shown in Step S1 of FIG. 7, when the ignition key 31 is turned on, the capture operation instruction unit 2b reads out the previously set recording interval and number of recording frames (recording number) from the recorder control table 3b in the controller 2. Then, the capture operation instruction unit 2b generates an instruction signal indicating the read recording interval and recording number, outputs it to the recording and reproducing unit 4b, and sets the recording interval and the recording number in the capture operation with respect to the recording and reproducing unit 4b.

Next, as shown in Step S2, the controller 2 determines whether or not danger information has been detected with reference to the danger information determination table 3c based on the input state information. Then, the abnormality determination unit 2c determines that an abnormality has occurred in the automobile when the danger information is detected, and allows the screen data obtained through the capture operation to be recorded in the HDD 6b (Step S3).

When the danger information is not detected in Step S2, and the abnormality determination unit 2c determines that an abnormality has not occurred in the automobile, the capture operation is performed by the recording and reproducing unit 4b, and the screen data is recorded in the flash memory 6a (Step S4).

Then, as shown in Step S5, the performance number of the capture operation is counted in the recording and reproducing unit 4b, and in the case where the count value of the performance number is equal to or less than the recording number set in Step S1, the recording and reproducing unit 4b allows the flash memory 6a to additionally store the screen data through the capture operation (Step S6).

On the other hand, in Step S5, when the count value of the performance number exceeds the recording number set in Step S1, the recording and reproducing unit 4b allows the flash memory 6a to overwrite the screen data through the capture operation so that the oldest screen data is updated (Step S7).

Next, as shown in Step S8, the recording and reproducing unit 4b is placed in a standby state in which the capture operation is not performed until the recording interval set in Step S1 elapses. After that, when the recording interval elapses, the controller 2 determines whether or not the ignition key 31 has been turned off (Step S9). When the ignition key 31 has not been turned off, the process returns to Step S2. On the other hand, when it is determined that the ignition key 31 has been turned off, the controller 2 comes to a standstill.

Next, the capture operation when it is determined that an abnormality has occurred in an automobile will be described with reference to FIG. 8. The flowchart shown in FIG. 8 shows a detailed operation in Step S3 in FIG. 7.

Figure 8:
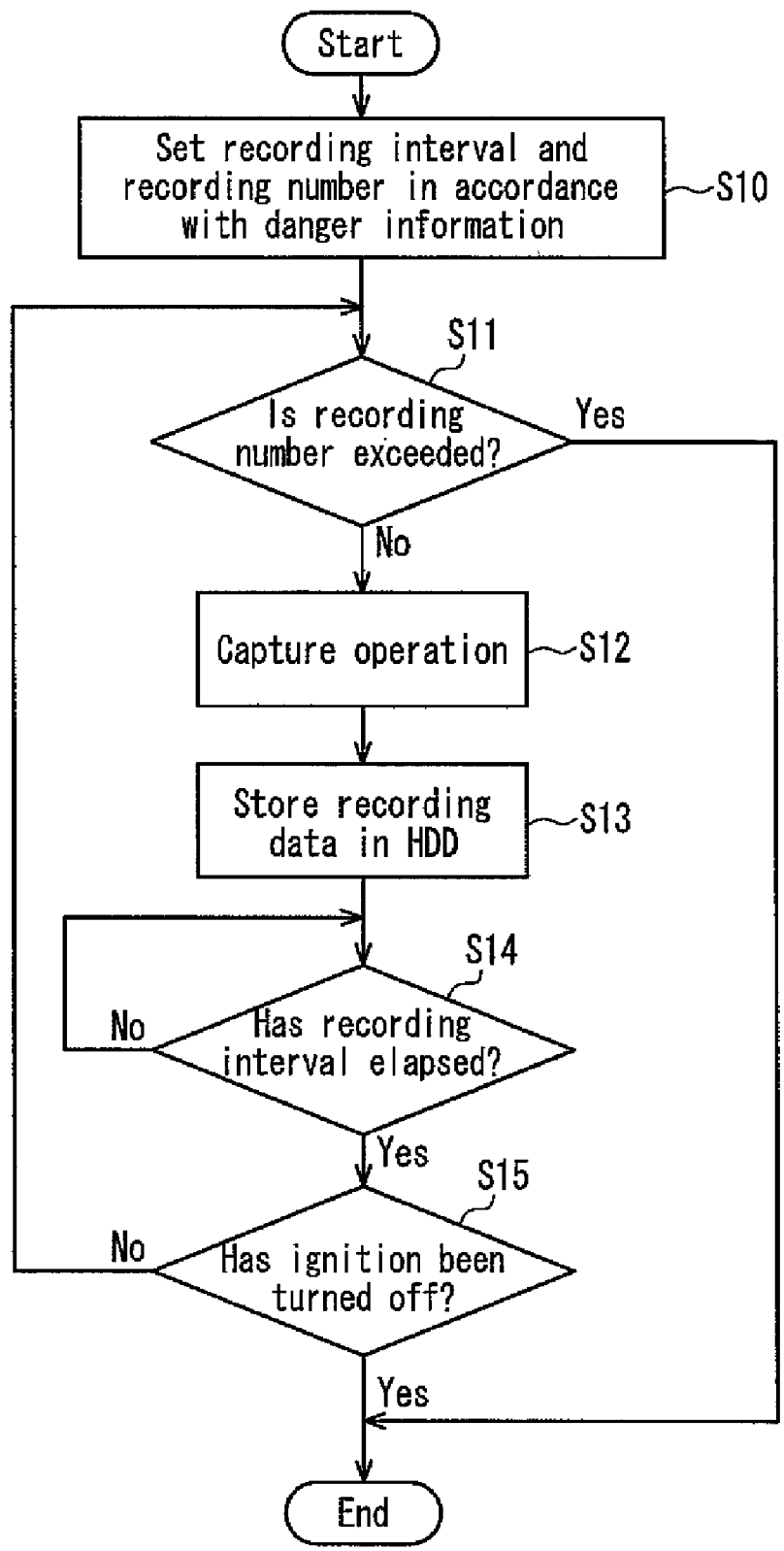
FIG. 8 is a flowchart showing a recording operation with respect to an HDD shown in FIG. 1.

More specifically, when the abnormality determination unit 2c detects danger information and determines that an abnormality has occurred in the automobile in Step S3, as shown in Step S10 of FIG. 8, the controller 2 reads out the recording interval and the number of recording frames (recording number) corresponding to the danger information from the table for a recorder control 3b, based on the danger information detected through the capture operation changing unit 2d. Furthermore, the capture operation changing unit 2d sets the recording interval and the recording number read out via the capture operation instruction unit 2b in the recording and reproducing unit 4b.

Next, as shown in Step S11, the performance number of the capture operation is counted in the recording and reproducing unit 4b, and when the count value of the performance number exceeds the recording number set in Step S10, the controller 2 comes to a standstill.

On the other hand, in Step S11, in the case where the count value of the performance number of the capture operation is equal to or less than the recording number set in Step S10, the recording and reproducing unit 4b performs the capture operation (Step S12) and records the captured screen data in the HDD 6b (Step S13).

Then, as shown in Step S14, the recording and reproducing unit 4b stays at a standstill in which the capture operation is not performed until the recording interval set in Step S10 elapses. After that, when the recording interval elapses, it is determined whether or not the ignition key 31 has been turned off in the controller 2 (Step S15). When the ignition key 31 has not turned off, the process returns to Step S11. On the other hand, when it is determined that the ignition key 31 has been turned off, the controller 2 comes to a standstill.

Next, the reproducing operation by the recording and reproducing unit 4*b* will be described with reference to FIG. 9.

Figure 9:
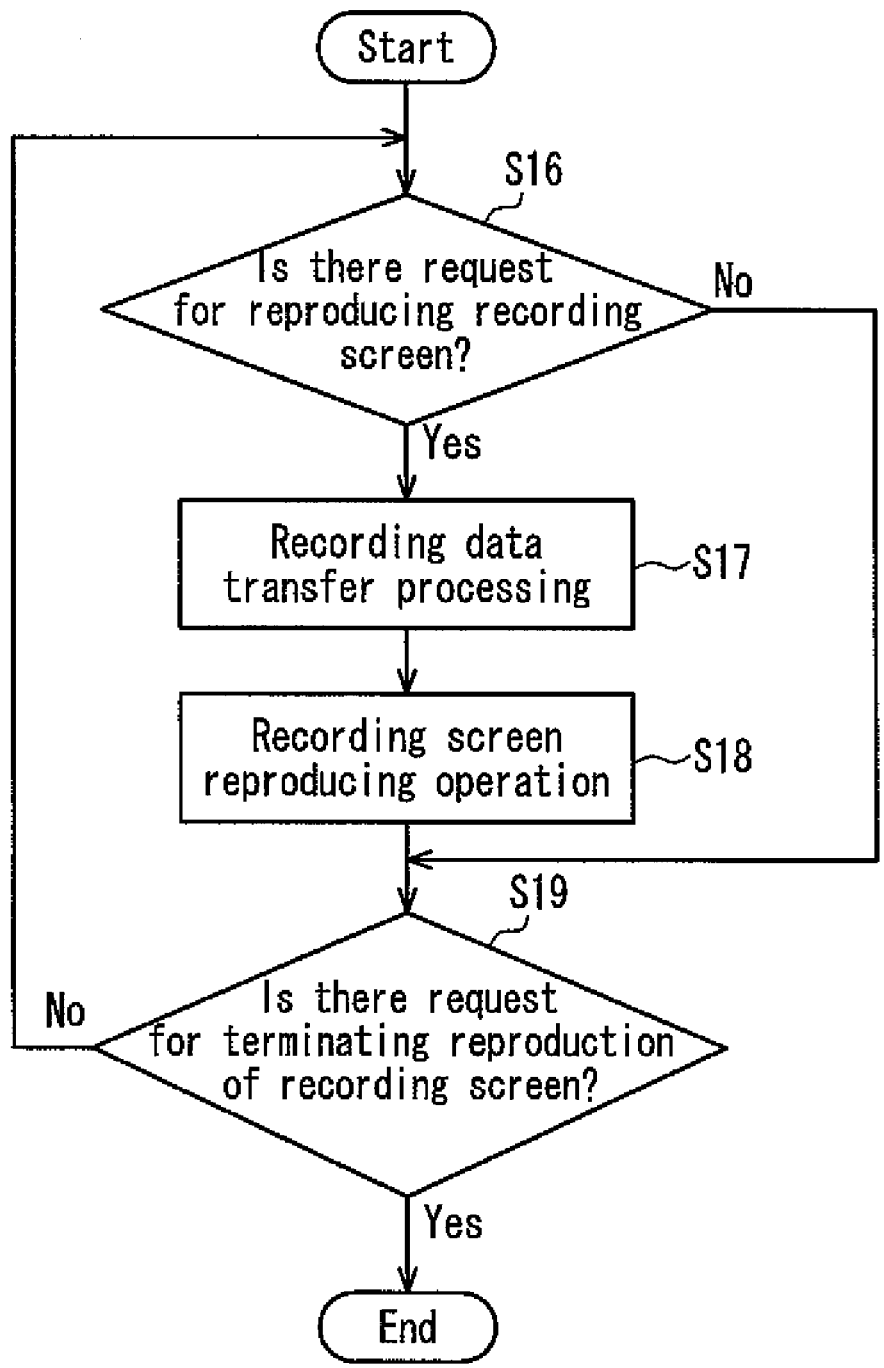
FIG. 9 is a flowchart showing a reproducing operation of screen data recorded in the flash memory or HDD.

As shown in Step S16 of FIG. 9, the controller 2 determines whether or not a request for reproducing the recorded display screen has been input from the operation input unit 7. Then, in the case that a request for reproduction is not input, the process proceeds to Step S19 described later.

On the other hand, when a request for reproduction is input in Step S16, the recording and reproducing unit 4*b* reads out the screen data designated by the request for reproduction from the flash memory 6*a* or the HDD 6*b*, subjects the screen data to data decompression processing, and transfers the screen data to the still image buffer 5*b* of the display memory 5 (Step S17).

Next, as shown in Step S18, the imaging module 4*a* outputs the screen data transferred to the still image buffer 5*b* to the liquid crystal display device 11, and allows the liquid crystal display device 11 to display the screen data. In the reproducing operation in Step S18, the imaging module 4*a* allows the liquid crystal display device 11 to reproduce and display the screen data without performing image processing such as image synthesis processing and scaling processing. That is, the screen data is the one displayed in the past on the display screen of the liquid crystal display device 11, and the display layout thereof and the like are not required to be changed.

Then, as shown in Step S19, the controller 2 determines whether or not the request for terminating the reproduction of the display screen has been input from the operation input unit 7, and when the request for terminating the reproduction is not input, the process returns to Step S16.

On the other hand, when the request for terminating the reproduction is input, the controller 2 comes to a standstill.

In addition to the above description, the screen data recorded on the recording medium 6 can also be output to be displayed on a display device other than the liquid crystal display device 11. That is, in the present preferred embodiment, the above screen data may be reproduced to be displayed, whereby the driver is allowed to visually recognize an exact operating state of the automobile so as to allow the operating state to be grasped more easily.

As described above, in the display control device 1 of the present preferred embodiment, the display operation determination unit 2*a* selects the state information to be displayed on the display screen of the liquid crystal display device 11 based on a plurality of pieces of the input state information. Furthermore, the display operation determination unit 2*a* determines the display position in the display screen of the display image based on the selected state information. Furthermore, the imaging module (image generation unit) 4*a* generates a plurality of display images based on a plurality of pieces of state information different from each other in accordance with the instruction signal from the display operation determination unit 2*a* and allows the display screen to display the plurality of display images simultaneously. Thus, the display control device 1 of the present preferred embodiment can constitute the display screen of integrated display images based on the operating state of the automobile (moving object), as illustrated in FIGS. 4 to 6. Thus, in the display control device 1 of the present preferred embodiment, a display image suitable for allowing the operating state of the automobile to be grasped can be displayed on the display screen of the liquid crystal display device 11.

Furthermore, in the display control device 1 of the present preferred embodiment, the capture operation instruction unit 2*b* allows the recording and reproducing unit (recording unit) 4*b* to perform the capture operation, whereby the display screen is captured as screen data and recorded on the recording medium 6. Thus, unlike the above-mentioned conventional example, the driver is allowed to grasp the operating state of the automobile easily and exactly.

Furthermore, in the display control device 1 of the present preferred embodiment, since the display operation determination unit 2*a* selects a display image suitable for allowing the operating state of the automobile to be grasped as described above, unnecessary image data can be prevented from being captured through the capture operation, and the amount of data to be recorded on the recording medium 6 can be minimized. Furthermore, even when an abnormality such as a traffic accident occurs in the automobile, screen data containing a suitable display image is recorded on the recording medium 6, so that the clarification and analysis of the cause of the abnormality such as accident verification and the like with respect to the traffic accident can be performed at high precision. Furthermore, the above-mentioned screen data to be recorded on the recording medium 6 is data on the display screen obtained by combining and integrating a plurality of suitable display images, so that the analysis and the like of the occurrence of an accident can be performed easily, compared with, for example, the case where data on a car speed, a steering angle, and the like before and after the occurrence of an accident are recorded separately.

Furthermore, the state information of the present preferred embodiment contains operation information regarding an instruction for an operation with respect to the automobile, the operating information regarding the operating state of the automobile including a speed and a moving direction of the automobile, and image pickup information from the left front camera 42, the right front camera 43, and the rear camera 44 provided in the automobile. Therefore, the display operation determination unit 2*a* can select and determine a display image to be displayed on the display screen of the liquid crystal display device 11 while grasping the operating state of the automobile more exactly. This allows the more exact operating state of the automobile to be grasped more easily.

Furthermore, in the display control device 1 of the present preferred embodiment, as shown in Step S10 of FIG. 8, the capture operation changing unit 2*d* changes the recording interval and the recording number (number of recording frames) in the capture operation, in accordance with the danger information. Thus, the recording interval and the number of recording frames of the screen data to be recorded on the recording medium 6 through the capture operation can be changed suitably in accordance with the abnormality occurring in the automobile. Consequently, the cause of the occurrence of an abnormality can be clarified at higher precision while the recording capacity of the recording medium 6 is used effectively. Specifically, for example, in the case where an accident occurs during high-speed traveling, the screen data is recorded with the recording interval set to be short and the recording period set to be long, whereby the usefulness as the recording information can be enhanced.

Furthermore, in the display control device 1 of the present preferred embodiment, the time information indicating current date and time from the time information providing unit 2*e* is contained in the screen data, so that the change with the passage of time of the operating state of the automobile can be grasped easily and exactly. Thus, the accident occurrence time, the elapse time from the accident occurrence, and the like can be known from the display screen that is reproduced and displayed, for example, during the verification of a traffic accident, and the usefulness as the recording information can be enhanced.

Furthermore, in the present preferred embodiment, as described above, the information display system that allows the operating state of the automobile to be grasped easily and exactly is constructed. Therefore, the module for a driver's seat allowing the operating state of the automobile to be grasped exactly and rapidly can be configured easily. Furthermore, an automobile with safety enhanced can be provided while a driving operation mistake is prevented from occurring.

Each of the above preferred embodiments is shown for an illustrative purpose and is not limiting. The technical scope of the present invention is defined by the claims, and all the changes within the scope equivalent to the configuration recited in the claims are also included in the technical range of the present invention.

For example, in the above description, the case where the present invention is applied to the information display system incorporated in the instrument panel of the automobile has been described. However, the present invention is not limited thereto. For example, the present invention is also applicable to an information display system using the display device in which an image is displayed or projected on a window on the front face of a driver's seat of a vehicle or the like, and the display device that is worn on the body of the operator.

Furthermore, in the above description, the case using the liquid crystal display device has been described. However, the present invention is not limited thereto and may be display devices having other flat display panels such as a CRT and a PDP. It is preferred that the above-mentioned dot matrix type display device is used because a display image based on the state information can be displayed at high precision.

Furthermore, the above description shows the case where the flash memory and the HDD are provided on the recording medium and a storage destination of screen data on a display screen through the capture operation is varied between the flash memory and the HDD before and after the determination of an abnormality in the abnormality determination unit. However, the recording medium of preferred embodiments of the present invention may be any medium as long as it can hold screen data on the display screen through the capture operation, and a non-volatile memory such as an EEPROM can also be used as the recording medium.

Furthermore, the storage destination of the screen data can also be varied before and after the determination of an abnormality, for example, by dividing the recording region of the HDD. Furthermore, in addition to the above description, the following configuration may be adopted, in which a recording unit and a reproducing unit are provided separately to allow them to perform a recording operation and a reproducing operation with respect to a recording medium.

Furthermore, in the above description, the case of using data (image pickup information) on picked-up images from the left front camera, the right front camera, and the rear camera provided in the automobile has been described. However, the image pickup information from the image pickup device, which is subjected to display processing by the display control device of preferred embodiments of the present invention, is not limited thereto. Specifically, for example, an image pickup device is set so as to rotate in a vehicle, and the display control device changes the image pickup direction of the image pickup device based on the state information, whereby the image pickup information following the traveling direction of the automobile is obtained to be used from the image pickup device.

The present invention can be used as a display control device in which the operating state of a moving object such as an automobile can be grasped easily and exactly based on the state information indicating the state of each part of the moving object, and an information display system for a moving object, a module for a driver's seat, and a moving object that use the display control device.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display control device that receives state information from each part of a moving object and that allows a display device to display a display image based on the input state information, the display control device comprising:
  a display operation determination unit arranged to select state information to be displayed on a display screen of the display device, based on a plurality of pieces of the input state information, and to determine a display position on the display screen of a display image based on the selected state information;
  an image generation unit arranged to generate a plurality of display images respectively based on the plurality of pieces of state information different from each other, in accordance with an instruction signal from the display operation determination unit, and to allow the plurality of display images to be displayed simultaneously on the display screen;
  a recording medium arranged to record data on the display image that is being displayed on the display screen;
  a recording unit arranged to perform a data recording operation with respect to the recording medium; and
  a capture operation instruction unit arranged to output an instruction signal to the recording unit on a predetermined time interval basis, thereby allowing the recording unit to perform a capture operation of capturing the display screen as screen data.

2. The display control device according to claim 1, wherein the state information contains operation information regarding an instruction for an operation with respect to the moving object, operating information regarding an operating state of the moving object including a speed and a moving direction of the moving object, and image pickup information from an image pickup device provided in the moving object.

3. The display control device according to claim 1, wherein the capture operation instruction unit allows a display screen to be subjected to the capture operation to be captured as screen data on one frame of a still image, and allows the recording unit to perform the capture operation with respect to the display screen in accordance with a recording interval and the number of recording frames previously set.

4. The display control device according to claim 1, further comprising an abnormality determination unit arranged to determine whether or not an abnormality has occurred in the moving object, based on the input state information, wherein the abnormality determination unit notifies the display operation determination unit of state information used in abnormality determination, when determining that an abnormality has occurred in the moving object, the display operation determination unit selects the notified state information as state information to be displayed on the display screen, when being notified of the state information from the abnormality determination unit, determines a display position on the display screen, and notifies the capture operation instruction unit of an occurrence of an abnormality, and the capture operation instruction unit allows the recording unit to perform the capture operation, when being notified of the occurrence of an abnormality from the display operation determination unit.

5. The display control device according to claim 4, further comprising a capture operation changing unit arranged to be notified of the state information used in abnormality determination from the abnormality determination unit, determines a recording interval and the number of recording frames in the capture operation which the capture operation instruction unit indicates with respect to the recording unit, based on the notified state information, and changes the recording interval and the number of recording frames.

6. The display control device according to claim 1, further comprising a time information providing unit arranged to notify the image generation unit of time information indicating current date and time, thereby allowing the time information to be displayed on the display screen.

7. The display control device according to claim 1, wherein the recording unit performs predetermined data compression processing, when recording the screen data on the recording medium through the capture operation.

8. The display control device according to claim 1, further comprising a reproducing unit arranged to reproduce the screen data recorded on the recording medium, and a reproducing operation instruction unit that allows the reproducing unit to perform a reproducing operation of the screen data, in accordance with an instruction signal from outside.

9. An information display system for a moving object, comprising the display control device according to claim 1, and a display device arranged to display a display image generated by the image generation unit of the display control device.

10. A module for a driver's seat attached around a driver's seat of a moving object, comprising the information display system for a moving object according to claim 9.

11. A moving object comprising the information display system for a moving object according to claim 9, wherein the display device is attached to a position that is recognizable visually at least from the driver's seat.

* * * * *